March 26, 1957    J. WILSON    2,786,695
HITCH MEANS WITH RESILIENTLY LOADED EXTENSIBLE STRUT
Filed June 7, 1954

Inventor
John Wilson
By Carlson, Pitzner, Hubbard & Wolfe
Atty's

United States Patent Office 2,786,695
Patented Mar. 26, 1957

2,786,695

HITCH MEANS WITH RESILIENTLY LOADED EXTENSIBLE STRUT

John Wilson, Leamington Spa, England, assignor to Massey-Harris-Ferguson Inc., Racine, Wis., a corporation of Maryland Application June 7, 1954, Serial No. 434,834

3 Claims. (Cl. 280—479)

The present invention relates to an improved suspension strut for use with tractors having power operated hitch linkages.

Tractors of the above type and particularly those equipped with hydraulically operated power lifts are commonly provided with mechanism for shutting off the lift mechanism when the hitch linkage is raised to its upper or transport position. When it is desired to use the power mechanism for operating auxiliaries, rigid stay bars or struts are interposed between the hitch linkage and the tractor to prevent transport shut-off by mechanically blocking the movement of the hitching links to transport position. Where some raising or lowering of the hitch links is required, as when the tractor is equipped with a linkage operated coupling mechanism, such as that disclosed in British Patent No. 665,904, published January 30, 1952, the strut is constructed so that it can be extended or collapsed to accommodate the limited link movement while still preventing movement of the links to transport position.

The present invention constitutes an improvement over the strut construction shown in the above British patent and it has for one of its objects the provision of an improved strut which permits extension of the hitch links through a range sufficient to operate the coupling mechanism and also to actuate the transport shut-off mechanism of the tractor, and which is further effective to load the power mechanism of the tractor before shut-off to provide for the operation of the auxiliaries.

Another object is to provide an improved strut construction operative to load the tractor hydraulic system before it is shut off and thus provide a supply of fluid under pressure for operation of the auxiliaries.

A further object is to provide a strut of the above character in which the loading of the hydraulic system is effected through the medium of a yieldable resistant, such as a compression spring.

Still another object is to provide a strut having a releasable latch means for retaining it in a collapsed condition and in which the load applying spring acts to maintain the latch engaged.

Other objects and advantages of the invention will become apparent from the following detailed description of the preferred embodiment illustrated in the accompanying drawing, in which Figure 1 is a fragmentary side view of a tractor equipped with a hitch actuated coupling mechanism and employing a strut embodying the features of the invention.

Figure 1:
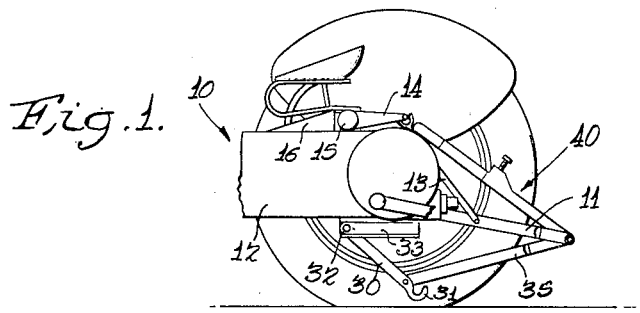

For purposes of illustration, the invention has been shown herein as embodied in a coupling mechanism especially designed for use on the "Ferguson" tractor. It will be appreciated, however, that various substitutions or changes in parts or alternative or modified arrangements may be used in accommodating the invention to other tractors and to mechanisms other than that shown. There is therefore no intention to limit the invention to the particular embodiment illustrated, but on the contrary the intention is to cover all alternative or equivalent constructions falling within the spirit and scope of the invention as expressed in the appended claims.

Referring to the drawing, the construction of the tractor and the coupling mechanism with which the invention has been illustrated, will be generally familiar to those skilled in the art and reference may be had to the above mentioned British patent for further details. For present purposes, it will suffice to point out briefly that the tractor 10 is equipped with the conventional "Ferguson" power-operated hitch linkage, which includes a pair of draft links 11 trailingly pivoted on the tractor's center housing 12. Drop links 13 support the hitch links 11 from crank arms 14 rigidly fixed to opposite ends of a transverse rockshaft 15 journaled on a cover plate 16 attached to and closing the upper portion of the housing 12.

Power for raising the hitch links is derived from a power unit on the tractor which, in the exemplary tractor is hydraulically operated. More particularly, the power unit comprises a one-way ram including a cylinder 20 supported within the tractor's center housing and having a working piston 21 operatively connected with the shaft 15 by a piston rod 22 having its ball-shaped outer end socketed in an arm 23 rigid with the shaft. Thus, admission of pressure fluid to the closed end of the cylinder 20 will force the piston 21 rearwardly and rock the shaft 15 in a direction to raise the hitch links 11, while exhaust of fluid from the cylinder permits the piston to retreat and the draft links to descend under the force of gravity.

In tractors of the above type, pressure fluid for operating the actuator is supplied by a pump (not shown) driven from the tractor engine and under control of valve means 24 actuated by a valve lever 25 pivotally supported at its upper end within the center housing. The lever may be swung manually to actuate the valve by means of a control or quadrant lever 26. Provision is also made for automatic actuation of the valve means in accordance with the draft forces on an implement attached to the hitch linkage through the medium of a spring biased control plunger 27. As the latter control is not employed under conditions which require the use of the improved strut, and moreover since its mode of operation is well known, further description of this aspect of the control mechanism is believed to be unnecessary.

In general, the arrangement of the hydraulic system is such that when the quadrant lever 26 is swung to its upper or "raised" position, valve means 24 is actuated to direct pressure fluid to the cylinder 20 and thus cause the links 11 to be swung upwardly about their pivots. As the links approach their uppermost or transport position, the skirt of the piston 21 engages a pad 28 on the lever 25 to shift the valve means to neutral position. In other words, the supply of fluid to the ram cylinder is interrupted and fluid is locked therein to maintain the draft links 11 in transport position.

To lower the draft links, the quadrant lever 26 is swung downwardly or in a "lowering" direction thus swinging the lever 25 so as to shift the valve means to a position to initiate exhaust of fluid from the ram cylinder. As the fluid is exhausted, the draft links swing downwardly under the gravity load imposed thereon.

Figure 2:
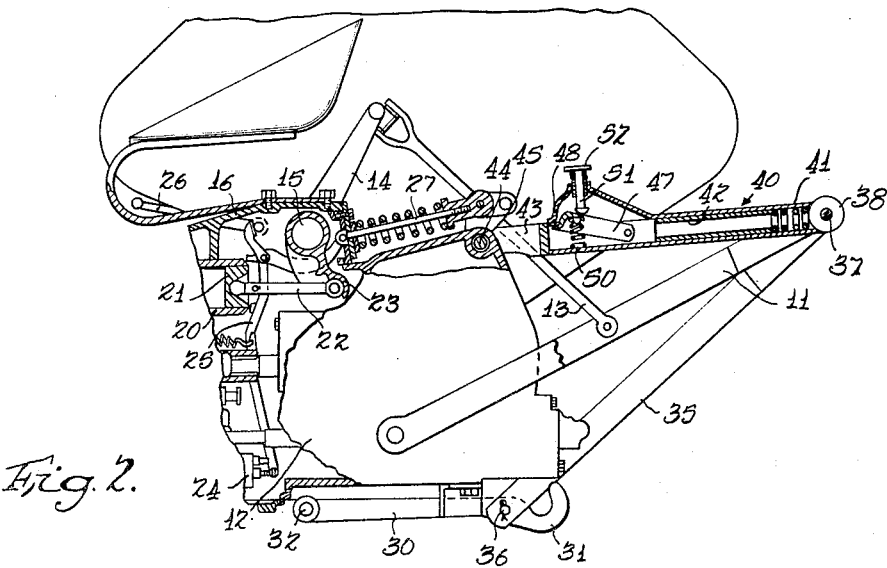
Fig. 2 is a view similar to Fig. 1 on a somewhat enlarged scale showing the coupling mechanism in engaged position.

The exemplary coupling mechanism shown installed on the tractor includes a link 30 carrying some suitable form of coupling element, in this instance a hook 31. As shown in Fig. 2, the link 30 is pivotally supported as at 32 adjacent its forward end on a bracket 33 fixedly attached to the underside of the tractor center housing. This permits the link to swing between the lowered release position, in which it is shown in Fig. 1, and the raised towing position, shown in Fig. 2.

Raising and lowering of the link 30 and hook 31 for coupling and uncoupling the tractor and trailing equipment is effected by raising and lowering the draft links 11. For this purpose the coupling link is connected with the free ends of the draft links by a pair of lift bars 35. The bars are disposed on opposite sides of the link 30 and are pivotally connected to it at their forward ends as by pin 36. The bars diverge rearwardly to overlie the ends of the draft links 11 and are pivotally connected to the links by pins 37 which, in this instance, constitute the reduced ends of a cross bar 38 extending between the links, the pins being received in the usual apertured balls socketed in the ends of the links and projecting through the balls for co-operation with the bars 35.

In the structure above described, the link 30 and bars 35 constitute a jointed supporting linkage for the coupling element 31. The linkage jackknifes or sags downwardly to the position shown in Fig. 1 when the draft links 11 are lowered, thus locating the hook in a position for convenient engagement with or disengagement from a mating coupling element on the trailed equipment. As the draft links rise toward the position shown in Fig. 2, the supporting linkage tends to straighten out, elevating the coupling element or hook 31 to the operated or towing position shown. To permit the hydraulic system to be shut off in the conventional manner when the coupling link reaches towing position, the draft links 11 must be permitted to rise to their normal transport position. Under those conditions, the transport shut-off means operates as previously described to interrupt the operation of the pump and thus prevent objectionable pumping through the relief valve.

The improved suspension strut indicated generally at 40 when connected between the hitch linkage and the tractor permits movement of the draft links 11 to transport position and, as an incident to such movement, it acts to load the hydraulic system and thus provide a supply of fluid under pressure for operating auxiliaries while the pump is shut off. Moreover, the strut 40 serves to releasably latch the draft links in the raised position and thus precludes inadvertent dropping of the coupling hook to uncoupling position.

In its preferred form, the suspension link 40 comprises a pair of elongated members assembled in overlapping relation for relative endwise movement. The members 41 and 42 may be conveniently constructed of tubular stock of rectangular or square cross section and interfitted in telescoping relation. One of the members, in this instance the outer member 41, has its outer end welded or otherwise rigidly joined to the cross bar 38 approximately centrally of the bar. The other or inner member 42 terminates in a clevis 43 adapted to be anchored to the tractor by a transverse pin 44 received in apertured bosses 45 normally provided on the center housing 12 of the "Ferguson" tractor.

The telescoping members 41 and 42 are of sufficient length to remain in telescoped relation with each other throughout the full normal range of the lowering movement of the draft links 11. As the links are raised, the strut collapses, that is, the members slide or telescope together and the inner end of the member 42 thus approaches the cross bar 38. In accordance with the invention, the member 42 is dimensioned so that its end is separated or spaced from the cross bar a predetermined amount in the fully raised position of the draft links. Within that space is disposed a resilient resistant 46 abutting the cross bar and the end of the member 42 and adapted to oppose the relative movement of the members in at least the final range of their telescoping movement.

While the resistant 46 may be of any preferred character, it is shown herein as a relatively short, stiff, coiled, compression spring. Compression of this spring in the telescoping of the members 41 and 42 opposes upward movement of the hitch links 11 by the hydraulic lift on the tractor and thus loads the hydraulic system to a degree determined by the strength of the spring. In other words, the pressure of the fluid trapped in the ram cylinder 20 is determined by the strength of the spring and the pressure is maintained by the action of the spring after the pump is shut off. If desired, the spring 46 may be adjustable or two or more interchangeable springs may be provided to vary the compressive load and consequently the hydraulic pressure that will obtain at the moment of shutoff.

It will be evident that by appropriate selection of springs or by suitable adjustment thereof, any desired pressure may be maintained in the system for the operation of the auxiliaries, subject, of course, to the limitation that it cannot be greater than the pressure at which the safety valve of the hydraulic system is set to blow off. To afford a maximum range of pressure, a resistant or spring is preferably selected which will permit the transport shutoff to take place just before the pressure in the system rises to the blowoff setting of the safety valve. In this way, maximum pressure is made available without objectionable blowoff of the safety valve and this is done automatically without intervention by the operator of the tractor.

Figure 3:
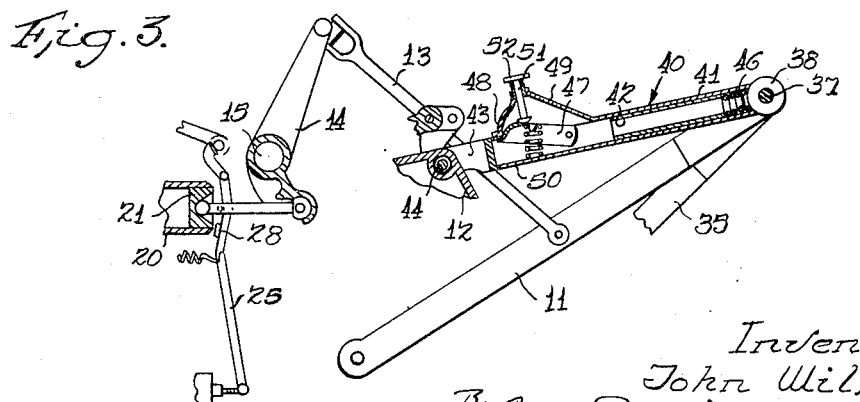
Fig. 3 is a view showing the hitch raised beyond the position shown in Fig. 2 for operating the transport shut-off mechanism of the tractor.

The improved suspension strut further serves to mechanically latch the draft links 11 in raised position and thereby precludes inadvertent release of the coupling mechanism. For this purpose, provision is made for mechanically latching the telescoping strut members 41 and 42 against re-extension after the strut has been collapsed as above described. The latch means as herein shown comprises a latch element or finger 47 pivoted at one end on the inner strut member 42 and adapted to swing laterally of that member into the path of a keeper or abutment 48 on the outer member 41. The abutment 48 as herein shown constitutes the forward wall of a housing 49 formed on or attached to the forward end of the member 41 and defining a chamber for the accommodation of the latch element. To automatically engage the latch mechanism upon collapse of the strut, the element 47 is biased to latching position by a spring 50 arranged to urge the element outwardly toward the position shown in Figs. 2 and 3.

Provision is made for releasing the latch element manually when the draft links 11 are to be lowered. As shown, the release means comprises a plunger 51 slidably supported in the housing 49 for movement transversely of the latch element and having its inner end bearing against a suitable pad on the element. A large button or head 52 is provided on the outer end of the plunger for convenience in pushing it inwardly to release the latch.

The latch element 47 may be positioned to engage the keeper 48 either before or after the loading spring 46 has been compressed, as desired. In the latter case, the force exerted by the spring assists in maintaining the latch engaged. With either arrangement, however, the coupling mechanism is positively retained in towing position until released by actuation of the plunger 51.

I claim as my invention:

1. For use with a tractor having a trailing hitch linkage, a hydraulic actuator for raising and lowering the linkage and valve means operative as the linkage is raised to a predetermined limit position for interrupting the supply of pressure fluid to and trapping fluid in the actuator, a collapsible strut comprising a pair of members assembled for relative endwise movement and connectible between the linkage and an anchorage point on the tractor, said members being relatively shifted as an incident to the raising and lowering of the links, and spring means stressed by the relative shifting of said members as the linkage is raised toward said limit position for loading said actuator to maintain the fluid therein under pressure for the operation of auxiliaries after interruption of the fluid supply to the actuator.

2. For use with a tractor having a trailing hitch linkage, a hydraulic actuator for raising and lowering the linkage and valve means operative as the linkage is raised to a predetermined limit position for interrupting the supply of pressure fluid to and trapping fluid in the actuator, a collapsible strut comprising a pair of members assembled for relative endwise movement and connectible between the linkage and an anchorage point on the tractor, said members being relatively shifted as an incident to the raising and lowering of the links, and spring means stressed by the relative movement of said members as the linkage is raised toward said limit position for loading said actuator to maintain the fluid therein under pressure, and releasable latch means operable to restrain said members against movement in a direction to permit lowering of the linkage from said limit position.

3. For use with a tractor having a vertically swingable hitch linkage, a hydraulic actuator for raising and lowering the linkage, and valve means operable to interrupt the supply of pressure fluid to the actuator and to trap fluid therein when the linkage is raised to a predetermined position, a strut comprising a pair of members assembled for relative endwise movement and connectible between the linkage and an anchorage point on the tractor so as to extend as the linkage is lowered and collapse as the linkage is raised, spring means operatively associated with said members so as to be stressed as the strut is collapsed, and releasable latch means for retaining the strut in collapsed condition.

References Cited in the file of this patent

FOREIGN PATENTS

| | | |
|---|---|---|
| 665,827 | Great Britain | Jan. 30, 1952 |
| 665,904 | Great Britain | Jan. 30, 1952 |